(12) United States Patent
Cerceau et al.

(10) Patent No.: US 9,601,786 B2
(45) Date of Patent: Mar. 21, 2017

(54) LEAKPROOFING DEVICE FOR FUEL CELL, UNIT AND FUEL CELL COMPRISING SUCH A DEVICE

(71) Applicant: L'Air Liquide, Societe Anonyme pour l'Etude et l'Exploitation des Procedes Georges Claude, Paris (FR)

(72) Inventors: Arnaud Cerceau, Charavines (FR); Alain Guinebert, Tullins (FR); Nicolas Jannin, Sassenage (FR); Elisabeth Rossinot, Meaudre (FR); Helene Trouve, Sassenage (FR); Denis Sirac, Moirans (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 14/433,254

(22) PCT Filed: Oct. 2, 2013

(86) PCT No.: PCT/FR2013/052342
§ 371 (c)(1),
(2) Date: Apr. 2, 2015

(87) PCT Pub. No.: WO2014/053770
PCT Pub. Date: Apr. 10, 2014

(65) Prior Publication Data
US 2015/0263360 A1 Sep. 17, 2015

(30) Foreign Application Priority Data

Oct. 3, 2012 (FR) .................................. 12 59363

(51) Int. Cl.
*H01M 2/38* (2006.01)
*H01M 8/02* (2016.01)
(Continued)

(52) U.S. Cl.
CPC ....... *H01M 8/0273* (2013.01); *H01M 8/0276* (2013.01); *H01M 8/2405* (2013.01);
(Continued)

(58) Field of Classification Search
CPC ....... H01M 2008/1095; H01M 8/0273; H01M 8/0276; H01M 8/0284; H01M 8/0286; H01M 8/2405; Y02E 60/50
See application file for complete search history.

(56) References Cited

U.S. PATENT DOCUMENTS 6,231,053 B1    5/2001  Wakamatsu
2008/0305384 A1*  12/2008  Kawashima ........ H01M 8/0273
                                                          429/433

(Continued)

FOREIGN PATENT DOCUMENTS

JP    2012 221559      11/2012
WO    WO 2011 158624   12/2011

OTHER PUBLICATIONS

International Search Report and Written Opinion for PCT/FR2013/052342, mailed Dec. 20, 2013.
French Search Report for FR 1259363, mailed Jun. 27, 2013.

*Primary Examiner* — Patrick Ryan
*Assistant Examiner* — Ben Lewis
(74) *Attorney, Agent, or Firm* — Christopher J. Cronin

(57) ABSTRACT

Leakproofing device for a fuel cell intended to be interposed between an Electrodes Membrane Assembly and a polar or bipolar plate of a fuel cell unit, the device consisting of a rigid frame and of a leakproofing seal integral with the frame, the frame furnished with the leakproofing seal defining a plurality of apertures through the device, the apertures being delimited by the leakproofing seal.

16 Claims, 3 Drawing Sheets

(51) Int. Cl.
*H01M 8/24* (2016.01)
*H01M 8/10* (2016.01)

(52) U.S. Cl.
CPC ........ *H01M 8/0284* (2013.01); *H01M 8/0286* (2013.01); *H01M 2008/1095* (2013.01); *Y02E 60/50* (2013.01)

(56) References Cited

U.S. PATENT DOCUMENTS

2011/0305967 A1 12/2011 Lee et al.
2013/0065158 A1 3/2013 Masaka et al.

* cited by examiner

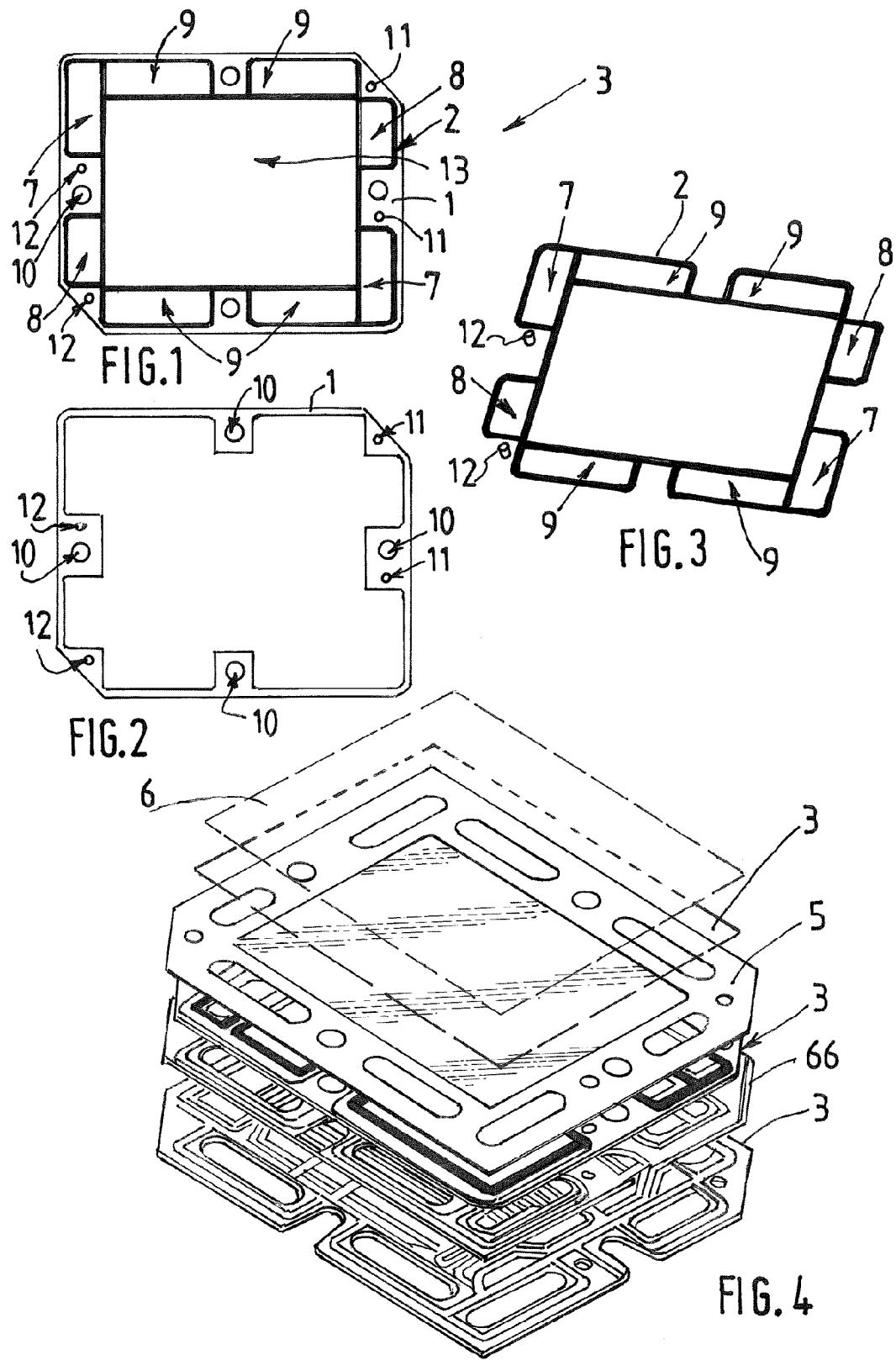

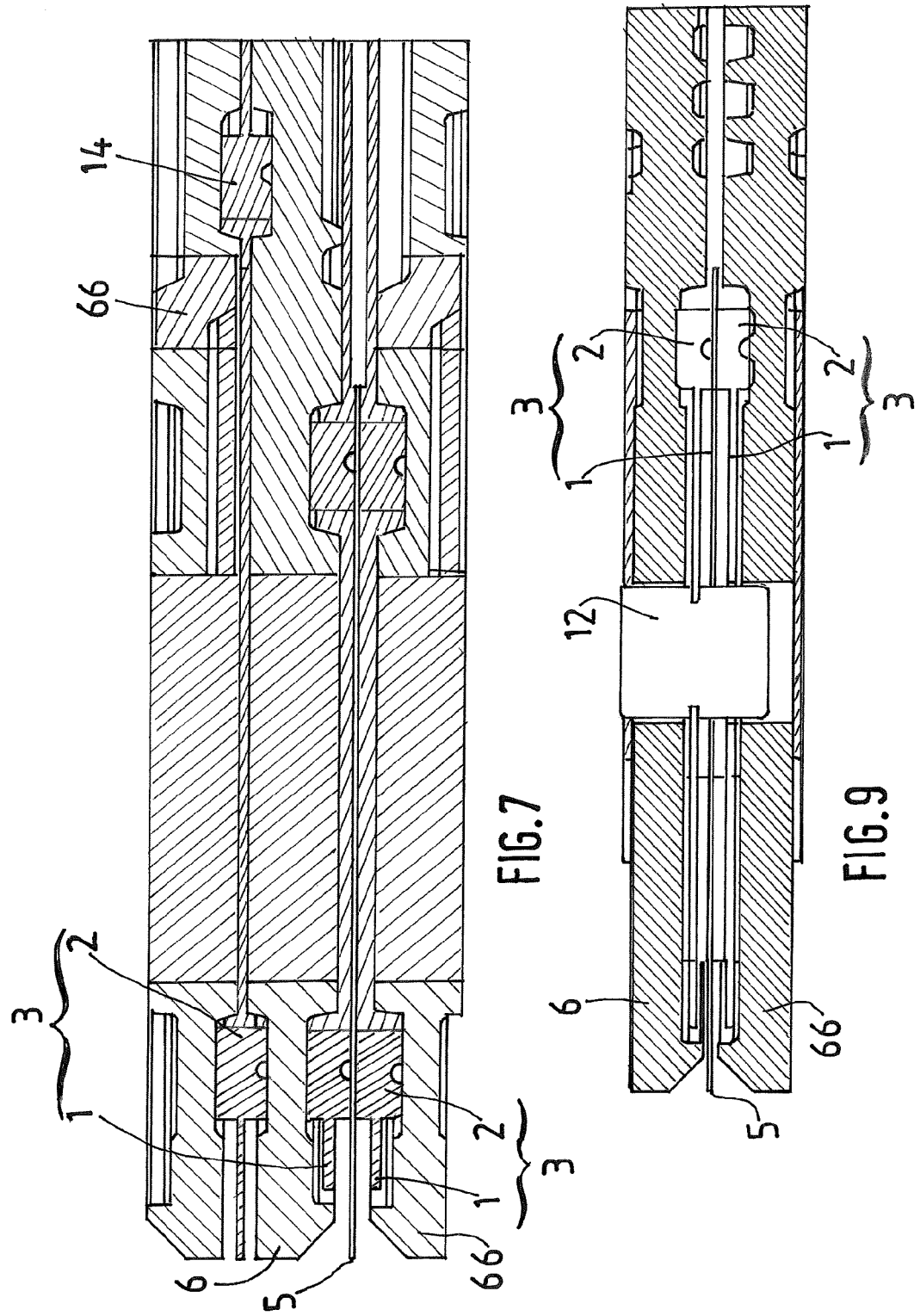

LEAKPROOFING DEVICE FOR FUEL CELL, UNIT AND FUEL CELL COMPRISING SUCH A DEVICE

CROSS-REFERENCE TO RELATED APPLICATIONS

This application is a §371 of International PCT Application PCT/FR2013/052342, filed Oct. 2, 2013, which claims §119(a) foreign priority to French patent application 1259363, filed Oct. 3, 2012.

BACKGROUND

Field of the Invention

The present invention relates to a sealing device for a fuel-cell stack and to a cell and a fuel-cell stack comprising such a device.

Related Art

A proton exchange membrane fuel-cell stack is an assembly (multilayer referred to as a stack) of a given number of elementary cells.

As schematically illustrated in FIG. 8, an elementary cell generally comprises a stack that contains the following elements:
  an anode plate 6 and a cathode plate 66;
  a membrane electrode assembly (MEA) 5;
  a sealing system 3 on the side of the fuel (hydrogen gas) supply network;
  a sealing system 3 on the side of the oxidant (air) supply network; and
  a system for sealing a coolant (liquid or air) supply network (not shown in FIG. 8 for the sake of simplicity).

The stack is compressed in order, on the one hand, to seal the cells, but also in order to compress the membrane electrode assembly (MEA) to a degree of compression that is optimal for operation of the cell. The cell is generally kept under pressure by end elements or tie rods.

The cells of fuel-cell stacks require seals in order to ensure they are leak tight to various gaseous or liquid reactants and to the coolant.

These seals must respect various constraints among which:
  they must be easily handleable for fitting/removal
  they must be positionable with relative precision between the membrane electrode assembly and the corresponding (polar or bipolar) stack plate;
  they must not contaminate the membrane electrode assembly;
  they must be able to withstand the ambient environment (reactants, pressure, temperature, etc.);
  etc.

The cost of such seals must also be compatible with economic constraints.

Multiple sealing-device solutions are known for fuel-cell stacks. Thus, for example, it is known to overmold a seal directly onto the plates of a stack. It is also known to produce bipolar plates by injecting molding of the sealant. However, these solutions do not allow the membrane electrode assemblies or the sealing device itself to be easily maintained. Specifically, if the seal fails the plate with its seal must be replaced, thereby increasing maintenance cost.

Document U.S. Pat. No. 6,231,053 describes a sealing device securely fastened to a membrane electrode assembly (MEA), which comprises a rigid sheet to which a flexible seal is vulcanized, the seal also being vulcanized to the MEA.

However, this device does not satisfactorily meet the above constraints, especially as regards the ease of differentiated maintenance of the MEA and the sealing system. Specifically, if the seal fails the MEA with its seal must be replaced, thereby increasing maintenance cost. The same goes if the core of the stack fails.

Another known solution consists in providing independent flexible seals possessing fastening systems for holding them against the plates during assembly. This solution however considerably increases the time taken to fit the seal. In addition, while it is being fitted, the seal may kink, thus threatening the reliability of the fitted seal.

Industrialization of fuel-cell stack manufacturing processes and the need to decrease manufacturing costs requires the time taken to assemble such assemblies to be decreased while a satisfactory level of reliability is nonetheless guaranteed.

SUMMARY OF THE INVENTION

One aim of the present invention is to mitigate all or some of the aforementioned drawbacks of the prior art.

In particular, one aim of the present invention is to provide a sealing device for a fuel-cell stack meeting all or some of the following constraints:
  the sealing device must be able to be easily handled manually or automatically;
  allow a seal to be placed and held in a seal groove;
  be easy to store, package and prepare for the fitting steps;
  the sealing device must be positionable on a part that does not contain a seal groove (such as on the membrane electrode assembly);
  not prevent the stack of cells from being assembled and compressed;
  seal the fluid supply and return networks from one another and from the exterior;
  make cell-by-cell maintenance of the MEAs possible and allow elements of the stack to be reused;
  allow the number of different sealing devices per cell to be decreased; and
  allow the MEA to be aligned relative to the plate, and the plate to be aligned relative to the MEA.

For this purpose, the fuel-cell stack sealing device, intended to be interposed between a membrane electrode assembly and a polar or bipolar plate of a cell of a fuel-cell stack, consists of a rigid frame and a sealing bead securely fastened to the frame, the frame equipped with the sealing bead defining a plurality of apertures through the device, the apertures being bounded by the sealing bead.

Moreover, embodiments of the invention may comprise one or more of the following features:
  the frame furthermore comprises clamping holes provided for the passage of a clamping system such as tie rods;
  the frame furthermore comprises centering holes and centering pins, the centering pins being perpendicular to the plane of the frame and being intended to interact with conjugated centering holes of an adjacent element, such as a membrane electrode assembly, and optionally with housings in an anodic or cathodic plate, the centering holes being provided to receive the centering pins of the frame of an adjacent sealing device in a given stack of fuel cells;
  the device comprises sealing bead portions on either side of the plane defined by the frame and, in cross section through a plane perpendicular to the plane of the frame, the frame being located between ends of the sealing bead that are located on either side of the plane of the frame;

in cross section through a plane perpendicular to the plane of the frame, the frame is located at the midpoint of the thickness of the sealing bead;

at least one portion of an edge bounding at least one aperture consists only of a sealing bead;

the device comprises a plurality of peripheral apertures formed around a central aperture, the central aperture being intended to be superposed on an active area of a membrane electrode assembly, at least one portion of the border bounding the central aperture being common to the respective borders of the peripheral apertures, and in that the portions of the borders common to the central aperture and to the peripheral apertures consist only of a sealing bead;

the sealing bead comprises a hard or soft seal, for example an elastically or plastically deformable seal;

the frame is flat, or it is not;

the rigid frame, whether flat or not, comprises stiffening ribs;

the thickness of the rigid frame is comprised between 0.1 and 0.9 mm and preferably between 0.2 and 0.5 mm;

the thickness of the sealing bead (in a direction perpendicular to the plane of the frame) is comprised between 0.4 mm and 4 mm and preferably between 1 and 1.5 mm and even more preferably between 1.20 mm and 1.30 mm;

the width of the sealing bead (in a direction parallel to the plane of the frame) is comprised between 1.5 mm and 2.5 mm and preferably between 2 mm and 2.35 mm;

in transverse cross section, the rigid frame is centered on the sealing bead so as not to project beyond it into the manifolds of the cell in the assembled position.

The invention also relates to an elementary cell of a fuel-cell stack, comprising two polar or bipolar stack plates sandwiching a membrane electrode assembly, the cell comprising two sealing devices placed on either side of the membrane electrode assembly, respectively, and facing a corresponding plate, in order to ensure reactive-fluid circuits are sealably separated in the cell and to ensure a set spacing within the cell.

According to possible embodiments:

the cell comprises two polar stack plates, using at least one sealing device positioned between the two faces of the plates dedicated to cooling;

the frame of each sealing device comprises centering holes and centering pins, the centering pins of one of the sealing devices interacting with centering holes formed in the other sealing device through orifices formed through the membrane electrode assembly in order to ensure the membrane electrode assembly is centered with respect to the plates;

the two sealing devices are of identical structure;

the two sealing devices are securely fastened via a pliable flexible joint;

the two sealing devices are securely fastened via a demountable joint;

the peripheries of the facing plates each contain a notch, a bevel for example, level with the border of the MEA; and in the plane of the frame, the frame and the sealing bead are symmetrical about the center of the frame.

The invention also relates to a fuel-cell stack, especially a proton exchange membrane fuel-cell stack, comprising a stack of a plurality of elementary cells having any one of the features above or below.

The invention may also relate to any alternative device or process comprising any combination of the features above or below.

BRIEF DESCRIPTION OF THE FIGURES

Other particularities and advantages will become apparent on reading the following description, given with reference to the figures in which:

FIG. 1 shows a top view of a sealing device according to one possible example embodiment of the invention;

FIG. 2 shows a top view of a detail of the sealing device in FIG. 1, merely illustrating its rigid frame;

FIG. 3 shows a perspective view of a detail of the sealing device in FIG. 1, merely illustrating the sealing bead (a hard or soft seal) and centering pins;

FIG. 4 shows a schematic partial perspective view illustrating one example of a stack of fuel cells according to one possible embodiment of the invention;

FIG. 7 illustrates a cross-sectional view of a fuel-cell stack cell equipped with a sealing device according to the invention on either side of the proton exchange membrane;

FIG. 9 illustrates a cross-sectional view of a fuel-cell stack cell equipped with a sealing device according to the invention illustrating the fixture of a centering pin.

DETAILED DESCRIPTION OF THE INVENTION

The sealing device illustrated in FIG. 1 comprises a preferably rigid (though possibly ductile) frame of generally flat shape (see FIG. 2). The frame 1 for example consists of at least one of the following materials: an elastomer, a thermoplastic, a thermoset, a thermoplastic elastomer, a metal, an alloy, graphite. Preferably, the frame 1 has a thickness smaller than 3 mm. For example, the frame 1 has a thickness comprised between 0.1 and 0.5 mm and preferably 0.2 mm. As illustrated, the frame 1 may have a substantially square shape. A sealing bead 2 is overmolded onto the frame 1 (see FIG. 3).

The sealing bead 2 for example consists of at least one of: an elastomer, a thermoplastic, a thermoset, a thermoplastic elastomer. Preferably, the sealing bead 2 is overmolded on either side of the frame 1 (see FIGS. 5 and 6).

Figure 5:
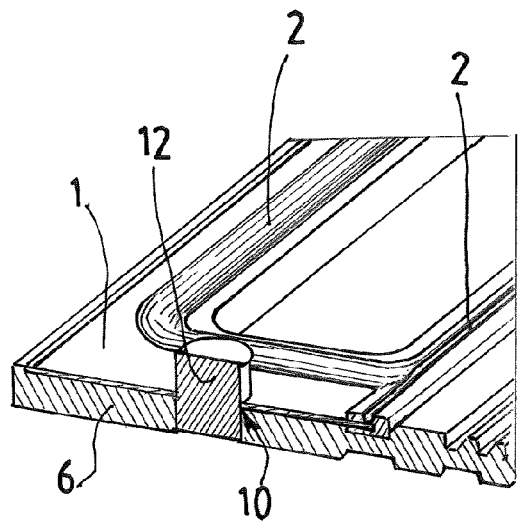
FIG. 5 shows a perspective view of a detail of the sealing device in FIG. 1, fitted to a stack plate.
Figure 6:
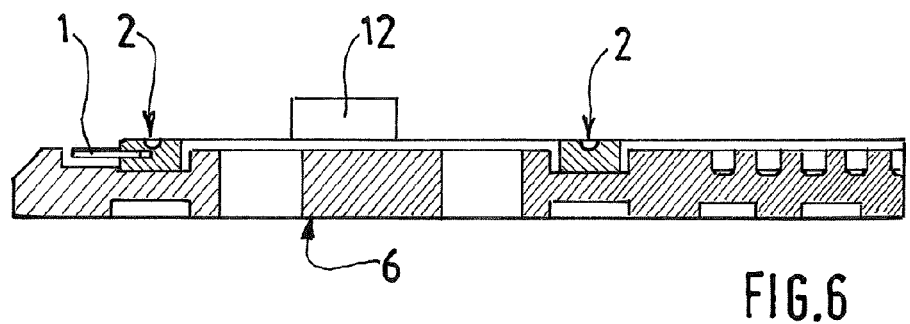
FIG. 6 shows a cross-sectional view of a detail of a detail of the sealing device in FIG. 1, fitted to a stack plate.
Figure 8:
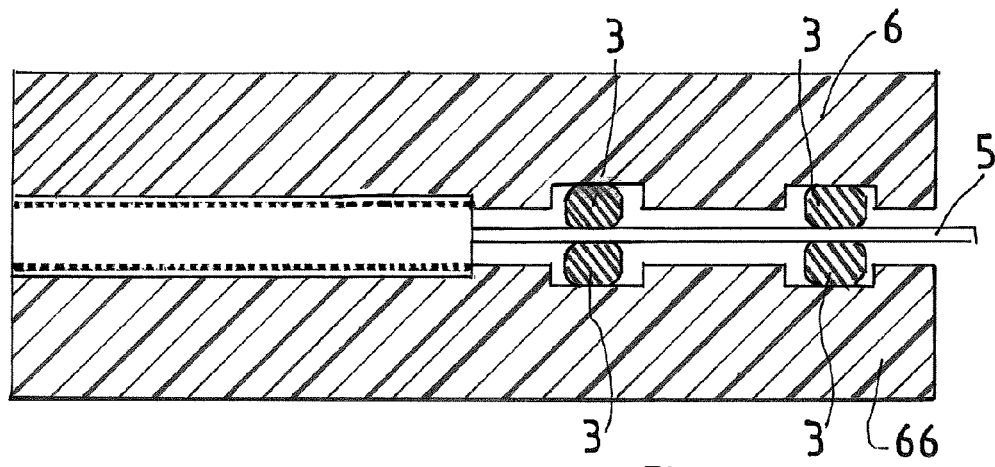
FIG. 8 schematically illustrates one example fuel-cell stack cell architecture in which the invention may be implemented.

As may be seen in FIGS. 5 and 6, the sealing bead 2 may be profiled in order to make it easier to compress. For example, the sealing bead 2 may be double lipped.

FIG. 7 illustrates a cross-sectional view of a fuel-cell cell in which two stack plates 6, 66 sandwich an MEA (membrane electrode assembly) 5. A sealing device 3 is placed on either side of the membrane electrode assembly (MEA), between the MEA and the corresponding plate 6, 66. FIG. 7 also shows, placed on the upper plate 6, a cooling-circuit seal 14 and the lower plate 66 of the adjacent cell.

As may especially be seen in FIG. 6 in transverse cross section, the rigid frame 1 is preferably located at the midpoint of the sealing bead 2. In this way, the frame 1 may be placed at distance from the adjacent elements of the stack (see FIGS. 6 and 7) and thus the frame 1 never makes contact with the reactive gases, the reaction products, the coolant and/or the active area of the cell. This makes it possible to considerably decrease the constraints on the chemical compatibility of the rigid frame 1 with the stack and to decrease significantly the cost thereof. The rigid frame 1 therefore does not make contact with the reactive elements of the cell because it is centered on the sealing bead and does not project therebeyond into the manifolds of the cell.

The sealing bead 2 for example has a thickness on each side of the frame 1 preferably comprised between 0.2 mm and 2 mm and therefore has an overall thickness preferably comprised between 0.4 mm and 4 mm. The sealing bead 2 for example has a width (in the plane of the frame 1) for example comprised between 2 and 3 mm.

The rigidity of the frame 1 makes it easier to manually position on a stack plate or on an MEA. The same rigidity makes it possible to envision automatization of the positioning of the seal during assembly without modification of the latter.

As may be seen in FIG. 1, the frame 1 comprises, preferably near its periphery, clamping holes 10 provided for the passage of the clamping system of the stack, such as tie rods for example. For example, the frame comprises four clamping holes 10 placed near the midpoint of the four sides of the frame 1, respectively. The presence of clamping holes 10 through the frame 1 makes it possible, if needs be, to avoid using an adhesion promoter before the overmolding of the sealing bead 2 and thus allows the chemical integrity of the MEA 5 to be preserved.

The frame 1 may also comprise one or more centering pins 12 and centering holes 11. These centering pins 12 make it possible in the assembly step to align the MEA on a stack plate 6, and vice versa. These centering pins 12 also make it possible to poka yoke the seal 3 on the plate 6, 66 and to poka yoke the MEA on the plate 6, 66 so that the anode side of the MEA is correctly located on the anodic side of the plate and so that the cathode side of the MEA is correctly located on the cathodic side of the plate.

Advantageously, each sealing device 3 comprises centering holes 11 and centering pins 12. In this way, and as illustrated in FIG. 9, the centering pins 12 of one of the sealing devices 3 of a cell may interact with centering holes 11 formed in the other sealing device 3 of the cell (and vice versa). The centering pins 12 may especially pass through orifices formed through the membrane electrode assembly 5 located between the two sealing devices. As illustrated in FIG. 9, the one or more pins 12 may also interact with a corresponding housing in the plates 6, 66 of the cell.

This makes it possible to precisely align and position the MEA 5 with respect to the plates 6, 66.

As may be seen in FIGS. 1 to 3, the sealing device 3 comprises a plurality of apertures 7, 8, 9, 13 bounded by the sealing bead 2. These apertures 7, 8, 9, 13 form respective passages for fluids. For example, the device comprises a plurality of peripheral apertures 7, 8, 9 formed around a central aperture 13. The central aperture 13 is intended to be superposed on an active area of a membrane electrode assembly. The peripheral apertures 7, 8, 9 for example comprise two radially opposite apertures 7 forming air inlet and outlet manifolds, respectively, two other radially opposite apertures 8 forming hydrogen inlet and outlet manifolds, respectively, and two opposite pairs of apertures 9 forming coolant inlet/outlet manifolds.

As illustrated, the border bounding the central aperture 13 may be common to the respective borders of the peripheral apertures 7, 8, 9. Preferably, as may be seen in FIGS. 2 and 3, the border portions common to the central aperture 13 and to the peripheral apertures 7, 8,9 consist only of a sealing bead 2, i.e. the frame 1 is not present in these locations. As may be seen in FIG. 5, this configuration allows, in the assembled position, the sealing bead 2 to be placed in a seal groove of a plate 6, as close as possible between a manifold and the active area of a cell.

As may be seen in FIG. 6, in order to prevent the frame 1 from being stressed during the clamping of the stack and in order to make it easier to position the sealing device 3, the area of the (for example monopolar) plate facing the frame 1 may be locally recessed or set back. This is preferably possible only for the zones of the plate that extend from the periphery of the sealing bead 2 as far as toward the exterior of the cell (to the left in FIG. 5). Specifically, decreasing the height of the area of the plate 6 facing the MEA would risk promoting internal gas leaks. In addition, in order to isolate electrically the two polar plates 6, 66, between which the MEA is located, and as may be seen in FIGS. 6 and 7, the peripheral ends of said plates may be beveled. This makes it possible to avoid the MEA projecting beyond the seal and makes it possible to align elements of the stack during assembly.

FIG. 4 schematically illustrates an elementary fuel-cell stack cell comprising two polar or bipolar stack plates 6, 66 sandwiching a membrane electrode assembly 5. Two sealing devices 3 such as described above are placed on either side of the membrane electrode assembly 5, respectively, and facing a corresponding plate 6, 66.

The sealing devices 3 thus ensure the various reactive-fluid circuits are sealably separated in the cell.

The absence of contact with the MEA 5 during the assembly greatly decreases the risk of chemical contamination of the stack core. The architecture of the device and if needs be the materials used also contribute thereto.

By placing the rigid frame 1 at the midpoint of the height of the sealing bead 2, an identical sealing device 3 may be used anode-side and cathode-side. The number of different constituent parts of the stack may thus be decreased and the risk of fitting errors is decreased.

In one possible variant, the two sealing devices 3 on the two sides of the MEA may be connected by a flexible material and thus form a single part.

For example, two sealing devices 3 are securely fastened via a demountable joint (on the exterior or through centering pins 12). This makes it possible to imprison elements and thus form fuel-cell stack subassemblies.

It may therefore easily be conceived that, while having a simple and inexpensive structure, the device allows not only:

a constant distance to be maintained between two (for example composite) stack plates 6, 66;
but also leak tightness to be ensured and the fuel-cell stack to be easily and precisely assembled and disassembled.

The device is compatible with various MEAs.

The device also allows the MEA to be aligned on the plate 6, 66 or vice versa (via the system of pins 12 and holes 11).

This type of sealing device may also be used to seal a liquid cooling network.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An elementary cell of a fuel-cell stack, comprising two polar or bipolar stack plates sandwiching a membrane electrode assembly and two sealing devices each one of which is placed on an opposing side of the membrane electrode assembly and facing a corresponding plate in order to ensure reactive-fluid circuits are sealably separated in the cell and to ensure a set spacing within the cell, wherein:
   each sealing device comprises a rigid frame and a sealing bead securely fastened to the frame;
   the frame is equipped with the sealing bead defining a plurality of apertures through the device;
   the apertures are bounded by the sealing bead;
   the frame of each sealing device comprises centering holes and centering pins, the centering pins of one of the sealing devices interacting with centering holes formed in the other sealing device through orifices formed through the membrane electrode assembly in order to ensure the membrane electrode assembly is centered with respect to the plates; and
   at least one portion of an edge bounding at least one aperture consists only of a sealing bead.

2. The cell of claim 1, wherein the two sealing devices are of identical structure.

3. The cell of claim 1, wherein the two sealing devices are securely fastened via a pliable flexible joint.

4. The cell of claim 1, wherein the two sealing devices are securely fastened via a demountable joint.

5. The cell of claim 1, wherein peripheries of the facing plates each contain a notch level with a border of the MEA.

6. The cell of claim 5, wherein the notch is a bevel.

7. The cell of claim 1, wherein at least one of the pins is received into a corresponding housing in the plates of the cell.

8. The cell of claim 1, wherein each sealing device comprises two pins and two centering holes.

9. The cell of claim 1, wherein, in a plane of the frame and relative to a center of the frame, each pin is placed symmetrically to a centering hole.

10. A proton exchange membrane fuel-cell stack comprising a stack of a plurality of the elementary cells of claim 9.

11. The cell of claim 1, wherein the frame further comprises clamping holes provided for the passage of a clamping system.

12. The cell of claim 11, wherein the clamping system comprises tie rods.

13. The cell of claim 1, wherein:
   the sealing device comprises sealing bead portions on either side of a plane defined by the frame; and
   in cross section through a plane perpendicular to the plane of the frame, the frame is located between ends of the sealing bead that are located on either side of the plane of the frame.

14. The elementary cell of a fuel-cell stack of claim 1, wherein said cell comprises two polar stack plates, using at least one sealing device positioned between the two faces of the plates dedicated to cooling.

15. An elementary cell of a fuel-cell stack, comprising two polar or bipolar stack plates sandwiching a membrane electrode assembly and two sealing devices each one of which is placed on an opposing side of the membrane electrode assembly and facing a corresponding plate in order to ensure reactive-fluid circuits are sealably separated in the cell and to ensure a set spacing within the cell, wherein:
   each sealing device comprises a rigid frame and a sealing bead securely fastened to the frame;
   the frame is equipped with the sealing bead defining a plurality of apertures through the device;
   the apertures are bounded by the sealing bead;
   the frame of each sealing device comprises centering holes and centering pins, the centering pins of one of the sealing devices interacting with centering holes formed in the other sealing device through orifices formed through the membrane electrode assembly in order to ensure the membrane electrode assembly is centered with respect to the plates; and
   the sealing device comprises a plurality of peripheral apertures formed around a central aperture, the central aperture being intended to be superposed on an active area of a membrane electrode assembly, at least one portion of the border bounding the central aperture being common to the respective borders of the peripheral apertures, and in that the portions of the borders common to the central aperture and to the peripheral apertures consist only of a sealing bead.

16. The cell of claim 15, wherein the sealing device comprises at least one pair of adjacent peripheral apertures placed along two adjacent and perpendicular edges of the frame, respectively, the two adjacent peripheral apertures comprising a common portion that is not common to the central aperture and that consists only of a sealing bead, the sealing bead, without the frame, being T-shaped level with said two adjacent peripheral apertures.

* * * * *